Patented Feb. 9, 1932

1,844,670

UNITED STATES PATENT OFFICE

MAHLON E. MANSON, OF MILWAUKEE, WISCONSIN, ASSIGNOR TO RUNDLE MANUFACTURING CO., OF MILWAUKEE, WISCONSIN, A CORPORATION OF WISCONSIN

ENAMELING COMPOSITION

No Drawing.    Application filed August 29, 1927.   Serial No. 216,337.

This invention relates to improvements in enameling composition, more particularly adapted for coating plumber's iron and steel ware.

All vitreous enamels are silicates. Silica, usually introduced as quartz, feldspar or other siliceous rock, is caused to combine chemically with various other ingredients, called fluxes, by means of heat treatment. These siliceous rocks all have a fusion point above the temperature usually used in smelting the enamel, so that the heat treatment required to take all of the silica into solution is high. This is particularly the case with acid resisting enamels, which must have a silica content not much below fifty per cent (50%) of the whole. In making a white, opaque enamel, an opacifier is used, usually a compound of tin or antimony, such as tin oxide, antimony oxide, sodium antimonate, etc. The more extended and severe the heat treatment of an enamel is during smelting, the less the opacifying effect of these opacifiers will be. In making an acid resisting white enamel, therefore, the heat treatment required to get fifty per cent (50%) of silica into solution, or combination, is so severe that the whiteness and opacity of the resulting enamel is greatly decreased.

It is one of the objects of the present invention to overcome the before mentioned objectionable features, and provide an enameling composition applicable for coating plumber's iron and steel ware, which will resist the ordinary acids to which it may be subjected in ordinary use.

A further object of the present invention is to provide an enamel composition in which the silica may be added to the composition in a form to retain the whiteness of the resultant enamel.

A further object of the invention is to provide an enameling composition in which the silica is added to the composition in the form of sodium silicate which is fusible at the smelting temperature ordinarily used.

A further object of the invention is to provide an enameling composition which is simple to manufacture, is efficient in use and is well adapted for the purpose described.

With the above and other objects in view, the invention consists of the improved enameling compound and its parts and combinations as set forth in the claims, and all equivalents thereof.

My invention consists in adding silica to an enamel in the form of sodium silicate, deducting enough soda carrying materials, such as soda ash, sodium nitrate, borax, etc., from the batch to allow for the soda introduced by the sodium silicate. The advantage of this method is that the siliceous material itself is fusible at the temperature of smelting, thus making it easier to combine the other fluxes used with the silica. The heat treatment necessary is thus reduced, with the result that a white, high silica content enamel can be produced. Furthermore, it has been found that the resultant enamel is more fusible than when made from quartz or feldspar, thus providing an enamel which can be worked faster and thereby increase production.

In forming the improved vitreous enamel composition, it has been found that a white acid resisting enamel can be made by smelting together sixty-eight (68) parts of sodium silicate, having a composition of twenty-three per cent (23%) soda ($Na_2O$), and seventy-four per cent (74%) silica, ($SiO_2$), five (5) parts of aluminum hydrate, thirteen (13) parts of borax, twelve (12) parts of sodium antimonate, six (6) parts of cryolite, and eight (8) parts of barium carbonate. The ingredients are smelted together in the ordinary manner.

Sodium silicate as now sold is of variable composition, as the ratio between soda and silica varies over rather wide limits. It is, therefore, to be understood that the invention is not to be limited to any one composition of sodium silicate, as it is only necessary to know its composition to get any desired amount of silica into the enamel, and adjust for the soda content of the sodium silicate by leaving out the requisite amount of soda carrying fluxes.

From the foregoing description, it will be seen that the enameling composition is very simple and well adapted for the purpose desired.

What I claim as my invention is:

1. An enameling composition for resisting ordinary acids consisting of approximately sixty-eight (68) parts of sodium silicate containing substantially twenty-three per cent (23%) soda and seventy-four per cent (74%) silica, five (5) parts of aluminum hydrate, thirteen (13) parts of borax, twelve (12) parts of sodium antimonate, six (6) parts of cryolite, and eight (8) parts of barium carbonate.

2. An enameling composition for resisting ordinary acids consisting of approximately sixty-eight (68) parts of sodium silicate containing a greater percentage of silica than soda, five (5) parts of aluminum hydrate, thirteen (13) parts of borax, twelve (12) parts of sodium antimonate, six (6) parts of cryolite, and eight (8) parts of barium carbonate.

In testimony whereof, I affix my signature.

MAHLON E. MANSON.